United States Patent [19]
Goto et al.

[11] 3,965,677
[45] June 29, 1976

[54] MISFIRE DETECTING APPARATUS FOR AN INTERNAL COMBUSTION ENGINE

[75] Inventors: Kenji Goto; Norio Shibata; Yukihide Hashiguchi, all of Susono, Japan

[73] Assignee: Toyota Jidosha Kogyo Kabushiki Kaisha, Toyota, Japan

[22] Filed: Mar. 25, 1975

[21] Appl. No.: 561,692

[30] Foreign Application Priority Data
Aug. 30, 1974 Japan................................ 49-98876

[52] U.S. Cl.................................. 60/277; 60/288; 73/117.3
[51] Int. Cl.².................... F02B 75/10; F02B 77/08
[58] Field of Search................ 60/277, 288; 73/116, 73/117.3, 117.2

[56] References Cited
UNITED STATES PATENTS

| | | |
|---|---|---|
| 3,415,114 | 12/1968 | Crampton............................ 73/117.2 |
| 3,908,366 | 9/1975 | Masaki.................................. 60/288 |
| 3,924,457 | 12/1975 | Oshima.................................. 73/116 |

*Primary Examiner*—Douglas Hart
*Attorney, Agent, or Firm*—Stevens, Davis, Miller & Mosher

[57] ABSTRACT

A value proportional to suction pressure is added to the difference between the maximum value and the minimum value of a pulsating exhaust pressure. When the sum exceeds a predetermined value, misfire of an engine is detected. The difference and the sum are formed electrically or pneumatically.

10 Claims, 4 Drawing Figures

MISFIRE DETECTING APPARATUS FOR AN INTERNAL COMBUSTION ENGINE

BACKGROUND OF THE INVENTION

This invention relates to misfire detecting apparatus for an internal combustion engine.

The internal combustion engine having a catalytic converter in the exhaust system has the serious drawback that the engine misfires on account of, for example, poor condition of the ignition device or the fuel system. The result is that the unburnt mixture emitted from the engine advances into the catalytic converter, which leads to the thermal failure of the converter due to enormous amounts of heat arising in a reaction therein. In order to avoid this draw back, an overheat preventing device for the catalytic converter must be actuated by detecting misfire of the internal combustion engine to check the catalytic converter from overheating.

SUMMARY OF THE INVENTION

An object of this invention is to provide apparatus for detecting such misfire.

In order to accomplish the object, the misfire detecting apparatus according to this invention comprises means to detect the maximum value of the pulsating exhaust pressure of the internal combustion engine, means to detect the minimum value of the exhaust pressure, means to detect the suction pressure of the engine, means to form the difference between the maximum value and the minimum value, addition means to add the difference to a value proportional to the suction pressure, and means to compare the addition result of the addition means with a predetermined value.

PREFERRED EMBODIMENTS OF THE INVENTION

This invention will be described in detail in connection with the illustrated embodiments.

Figure 1:
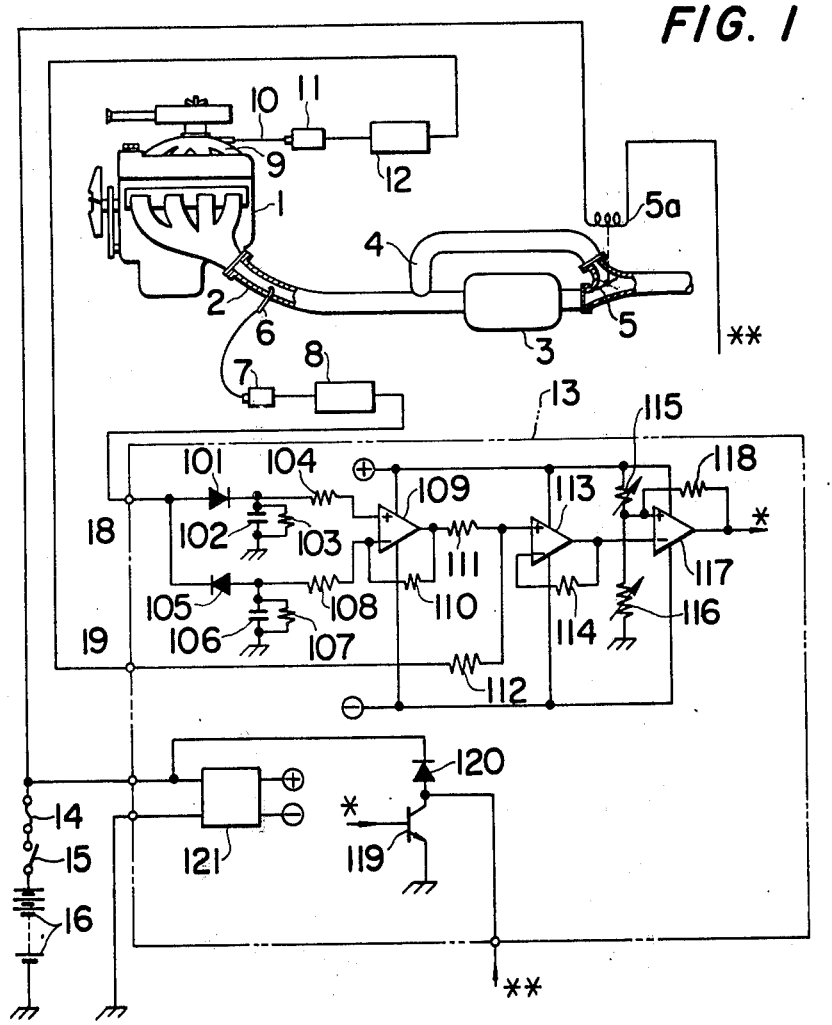
FIG. 1 is a constructional diagram of an emgodiment of this invention.

Referring to FIG. 1, a catalytic converter 3 is incorporated in a exhaust pipe 2 of an internal combustion engine 1. A by-pass pipe 4 is connected in parallel with the catalytic converter 3. In order to pass the exhaust gas selectively through either the catalytic converter 3 or the by-pass pipe 4, a control valve 5 is provided at the confluence between the exhaust pipe 2 and the by-pass pipe 4 on the downstream side of the converter 3. When a solenoid 5a for operating the control valve 5 is energized, the valve 5 moves from a position shown in solid lines to a position shown in broken lines, and the exhaust gas of the internal combustion engine is bypassed from the converter 3 to the by-pass pipe 4.

In order to detect an exhaust pressure P in the exhaust pipe 2, an exhaust pressure detector 7 is connected through a detection line 6 to a part of the exhaust pipe 2 which is close to the internal combustion engine 1. The pressure detected by the detector 7 or an electrical output proportional thereto is converted into an electric signal or is amplified by means of a transducer or an amplifier 8 (hereinbelow termed the transducer).

On the other hand, a suction pressure detector 11 is connected through a detection line 10 to a suction pipe 9 of the internal combustion engine 1. A suction pressure V detected by the detector 11 or an electrical output proportional thereto is converted into an electric signal or is amplified by means of a transducer or an amplifier 12 (hereinbelow termed the transducer).

The solenoid 5a of the control valve 5 is connected to a D.C. power source 16, with its negative polarity grounded, through a misfire detecting circuit 13 described in detail later, a fuse 14 and a switch 15.

The outputs of the transducers 8 and 12 are fed to input terminals 18 and 19 of the misfire detecting circuit 13, respectively.

Figure 2:
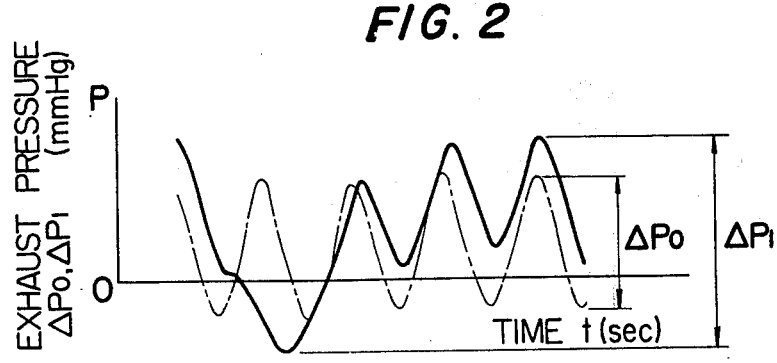
FIG. 2 is a graph for explaining the pulsation of the exhaust gas of an internal combustion engine.
Figure 3:
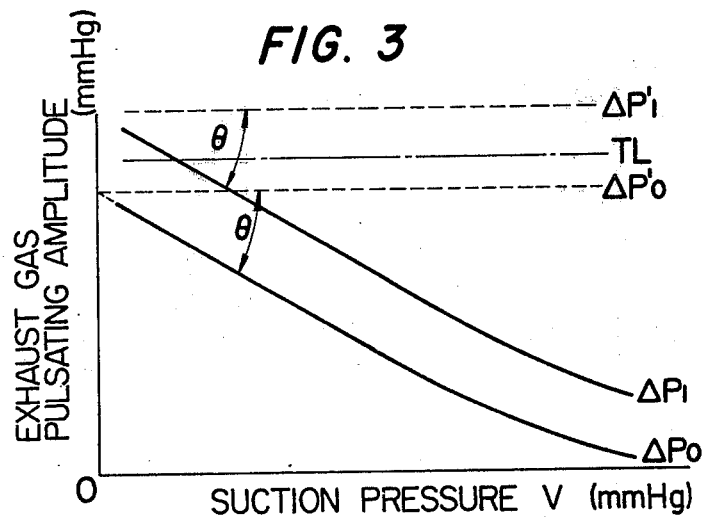
FIG. 3 is a graph illustrating the relationship between the suction pressure and the pulsating amplitude of the exhaust gas.

In the following explanation, the values of the pressures are assumed to be positive or negative with the atmospheric pressure at 0 (zero). As understood from examples of measurements illustrated in FIG. 2, the exhaust pressure P pulsates along a curve shown by the one-dot chain line when the operation of the internal combustion engine 1 is normal, whereas it pulsates along a curve given by the solid line when, for example, one cylinder misfires. The differences (hereinafter termed the amplitudes) between the maximum values $P_{max}$ and the minimum values $P_{min}$ of the respective pulsations within a predetermined time are represented by $\Delta P_0$ and $\Delta P_1$. It has been experimentally determined that the values of the amplitudes $\Delta P_0$ and $\Delta P_1$ are functions chiefly of the suction pressure V, and that as illustrated in FIG. 3, they vary substantially linearly and at substantially the same inclination with respect to the suction pressure $V_0$. A line which is drawn in parallel to the abscissa axis from the point of intersection between the ordinate axis and the line $P_0$ is designated by $\Delta P_0'$. Likewise, a line $\Delta P_1'$ can be drawn in parallel to the abscissa axis from the point of intersection between the ordinate axis and the line $\Delta P_1$. Accordingly, $\Delta P_0' = \Delta P_0 + V \tan \theta$. That is, by multiplying the suction pressure V by a certain coefficient $\tan \theta$ and adding the product to the amplitude $\Delta P_0$ of the exhaust pressure pulsation, the substantially constant value $\Delta P_0'$ is obtained. On the other hand, $\Delta P_1' = \Delta P_1 + V \tan \theta$ in the misfire state of the internal combustion engine. Since $\Delta P_1'$ is obviously greater than $\Delta P_0'$, the misfire can be detected by setting a proper trigger level TL between the levels $\Delta P_1'$ and $\Delta P_0'$.

The misfire detecting circuit 13 serves to electrically detect the misfire from the relation among the suction pressure $V_n$ and the amplitudes $\Delta P_0$ and $\Delta P_1$ of the exhaust pressure pulsations.

The output terminal of the transducer 8, namely, the input terminal 18 of the detector circuit 13, is connected through a diode 101 with forward polarity as well as an input resistance 104 to the first input terminal of a subtractive operation amplifier 109 having a feedback resistance 110. The diode 101 has its cathode grounded through a parallel circuit consisting of a capacitor 102 and a resistance 103, and forms the maximum value $P_{max}$ of the pulsating exhaust pressure conjointly with the elements 102 and 103.

Similarly, the input terminal 18 is connected through a diode 105 with backward polarity as well as an input resistance 108 to the second input terminal of the operational amplifier 109. The diode 105 has its anode grounded through a parallel circuit consisting of a capacitor 106 and a resistance 107, and forms the minimum value $P_{min}$ of the pulsating exhaust pressure conjointly with the elements 106 and 107. In this manner, the pulsating amplitude $\Delta P_0$ or $\Delta P_1$ of the exhaust pressure, which is the difference between the maximum value $P_{max}$ and the minimum value $P_{min}$ of the pulsating exhaust pressure, is obtained at the output terminal of the operational amplifier 109.

The output of the amplifier 109 is fed through an input resistance 111 to the first input terminal of a summing operational amplifier 113 having a feedback resistance 114. The first input terminal is also connected through an input resistance 112 to the second input terminal 19 of the misfire detecting circuit 13, and can accordingly receive the output of the transducer 12 which is proportional to the suction pressure V. Thus, an output corresponding to $\Delta P_0' = \Delta P_0 + V \tan \theta$ appears at the output terminal of the amplifier 113, and it is fed to the first output terminal of an operational amplifier 117 which is a comparator and has a feedback resistance 118.

The second input terminal of the amplifier 117 is connected to the juncture between two variable voltage-dividing resistances 115 and 116 for setting the trigger level which are connected to the output terminal of a D.C. — D. C. converter 121 for transforming the voltage of the power source 16. An input corresponding to the trigger level TL is accordingly fed to the second input terminal.

The amplifier 117 is constructed so that when the level $\Delta P_0'$ lower than the trigger level TL is applied to its first input terminal, it provides no output, while when the level $\Delta P_1'$ higher than the trigger level TL is applied, it provides an output. That is, in case of the misfire of the internal combustion engine 1, the amplifier 117 delivers an output.

The output of amplifier 117 is fed to the base of an output transistor 119 having the collector connected through the solenoid 5a of the control valve 5 to the D. C. power source 16 and having the emitter grounded, and renders the output transistor 119 conductive. By the conduction of the transistor 119, the solenoid 5a is energized to move the valve 5 so as to operatively separate the catalytic converter 3 from the exhaust pipe 2 and to connect the by-pass pipe 4 in place thereof. Consequently, the exhaust gas no longer flows through the converter 3 which is thus protected from overheating. A diode 120 connected between the collector of the transistor 119 and the power source 16 functions to absorb a surge voltage.

Figure 4:
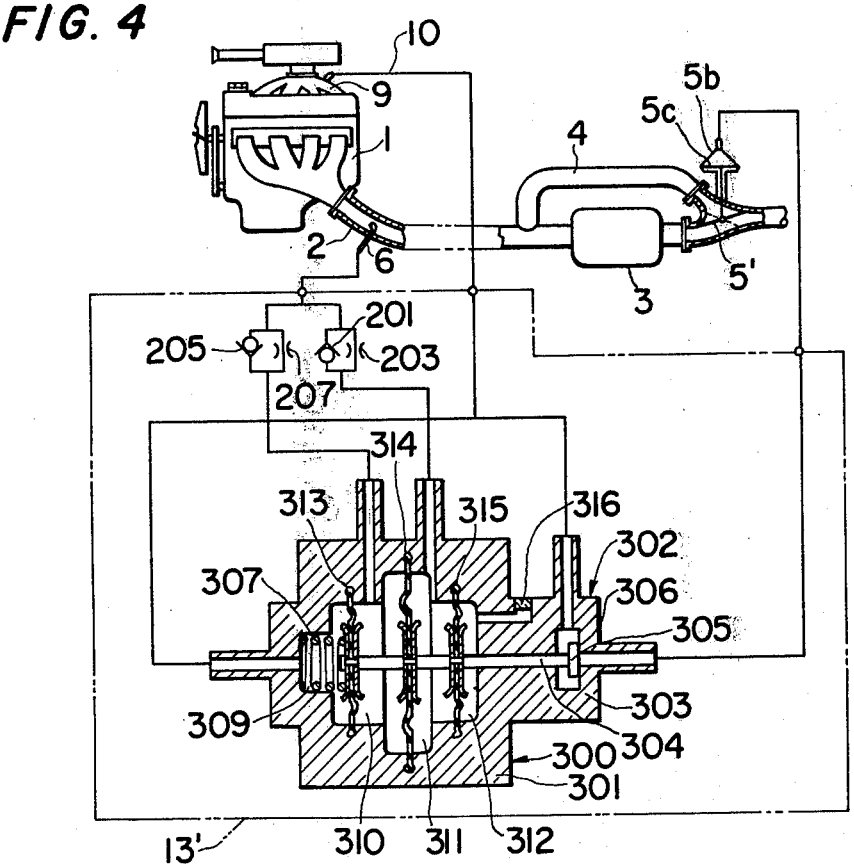
FIG. 4 is a constructional diagram of another embodiment.

FIG. 4 shows a misfire detecting circuit 13' which employs pneumatic pressures and which can be substituted for the electrical misfire detector circuit.

A housing 301 of a pneumatic pressure calculating unit 300 is divided into first, second, third and fourth diaphragm chambers 309, 310, 311 and 312 by three diaphragms 313, 314 and 315.

The exhaust pressure detecting line 6 opening to the exhaust pipe 2 of the internal combustion engine 1 is connected to the third diaphragm chamber 311 through a parallel circuit consisting of a check valve 201 adapted to open in the forward direction and a throttle 203 (which correspond to the elements 101 and 103 in FIG. 1), so that the maximum value $P_{max}$ of the pulsating exhaust pressure is given. The detecting line 6 is further connected to the second diaphragm chamber 310 through a parallel circuit consisting of a check valve 205 adapted to open in the backward direction and a throttle 207 (which correspond to the elements 105 and 107 in FIG. 1), so that the minimum value $P_{min}$ of the pulsating exhaust pressure is given. The first diaphragm chamber 309 is supplied with the suction pressure V of the internal combustion chamber through the detecting line 10. The fourth diaphragm chamber 312 communicates with the atmospheric air through a filter 316.

A control valve 5', which is used for passing the exhaust gas of the internal combustion engine selectively either through the catalytic converter 3 or through the by-pass pipe 4, is coupled to a diaphragm 5c defining a diaphragm chamber 5b. The diaphragm chamber 5b is supplied with the suction pressure V through a valve 302 which is formed integrally with the pneumatic pressure calculating unit 300.

A casing 303 of the valve 302 is integral with the casing 301 of the pneumatic pressure calculating unit. A valve body 305, which is joined to a rod 304 commonly coupling the three diaphragms 313, 314, and 315, acts in conjunction with a valve seat 306.

Here the areas of the diaphragms 313, 314 and 315 are selected to be $A_1$, $A_2$ and $A_1$, respectively. Then, a force F acting on the valve body 305 is given below on the assumption that the force in the direction of opening of the valve 302 is positive.

$$F = A_1 (V + P_{min}) + A_2 (P_{max} - P_{min}) - A_1 P_{max} = A_1 V - (A_2 - A_1)(P_{max} - P_{min}) = A_1 V + (A_2 - A_1) P_0$$

Letting $$\frac{A_1}{A_2 - A_1} = \tan \theta,$$

$$F \alpha V + \Delta P_0 \tan \theta$$

Therefore, the relation stated with reference to FIG. 3 is obtained.

In this case, a force of a spring 307 acting on the diaphragm 313 in the direction of closure of the valve 302 is set to be equal to the force F. Then, at the normal running of the internal combustion engine, the valve 302 is kept closed, the suction pressure is not fed to the diaphragm chamber 5b, and the valve 5' is at a position shown in solid lines. In contrast, when the internal combustion engine misfires, the rod 304 moves leftwards to open the valve 302, the suction pressure acts on the diaphragm 5c, the valve 5' is brought to a position shown in broken lines, the exhaust gas is by-passed to the by-pass pipe 4, and the catalytic converter 3 is protected from overheating.

Thus, according to this invention, the overheat preventing means for the catalytic converter is actuated on the basis of the relation between the suction pressure and the exhaust pressure. The response is therefore quicker than in the case of actuating the overheat preventing means on the basis of the detection of the temperature of the converter, so that reliable protection of the converter can be performed. Moreover, in accordance with the construction of FIG. 1, the misfire detecting circuit can be made compact, while in accordance with the construction of FIG. 4, the suction pressure itself can be used for the drive of the overheat preventing means without employing electric energy.

What is claimed is:

1. Misfire detecting apparatus for an internal combustion engine, comprising: means to detect a maximum value of a pulsating exhaust pressure of the internal combustion engine; means to detect a minimum value of the pulsating exhaust pressure; means to detect a suction pressure and provide a value proportional to the suction pressure; means to form a difference between the maximum value and the minimum value; addition means to add the difference to the value proportional to the suction pressure; and means to compare the result of addition of said addition means with a predetermined value.

2. Misfire detecting apparatus as claimed in claim 1, wherein said means to detect a maximum value of a pulsating exhaust pressure of the engine comprises a transducer for converting the exhaust pressure of the engine to an electric output signal proportional to the exhaust pressure, a diode connected with forward polarity to the output of said transducer, and a parallel circuit including a capacitor and a resistor, said parallel circuit being connected to one end to the cathode of said diode and grounded at the other end.

3. Misfire detecting apparatus as claimed in claim 1, wherein said means to detect a minimum value of the pulsating exhaust pressure of the engine comprises a transducer for converting the exhaust pressure of the engine to an electric output signal proportional to the exhaust pressure, a diode connected with backward polarity to the output of said transducer, and a parallel circuit including a capacitor and resistor, said parallel circuit being connected at one end to the anode of said diode and grounded at the other end.

4. Misfire detecting apparatus as claimed in claim 1, wherein said means to form a difference between the maximum value and the minimum value includes an operational amplifier having two outputs applied respectively with a signal proportional to the maximum value and a signal proportional to the minimum value.

5. Misfire detecting apparatus as claimed in claim 1, wherein said additional means includes an operational amplifier applied with the difference between the maximum value and the minimum value and a signal proportional to the suction pressure.

6. Misfire detecting apparatus as claimed in claim 1, wherein said means to compare the result of addition of said addition means with a predetermined value includes a first operational amplifier having two inputs connected respectively to a second operational amplifier applied with the difference between the maximum value and the minimum value and a signal proportional to the suction pressure and to a trigger level setting potentiometer having two variable voltage dividing resistors.

7. An internal combustion engine comprising: a catalytic converter incorporated in an exhaust pipe of the engine; a by-pass pipe connected in parallel with said converter; a control valve for selectively passing exhaust gas of the engine through either of said converter and said by-pass pipe; means to operate said control valve; means to detect a maximum value of a pulsating exhaust pressure of the engine; means to detect a minimum value of the pulsating exhaust pressure; means to detect a suction pressure and provide a value proportional to the suction pressure; means to form a difference between the maximum value and the minimum value; addition means to add the difference to the value proportional to the suction pressure; and means to compare the result of addition of the addition means with a predetermined value and energize said means to operate said control valve.

8. An internal combustion engine as claimed in claim 7, wherein said control valve comprises a solenoid, and said means to compare and energize includes a switching transistor conducting in response to the comparison, said solenoid being energized through said transistor.

9. An internal combustion engine comprising: a catalytic converter incorporated in an exhaust pipe of the engine; a by-pass pipe connected in parallel with said converter; a control valve for selectively passing exhaust gas of the engine through either of said converter and said by-pass pipe; means to operate said control valve; a pneumatic operational unit including a housing, a first, a second, a third and a fourth diaphragm chamber divided from one another by a first, a second, and a third diaphragm in said housing, said first diaphragm chamber being connected to a suction system of the engine, said second diaphragm chamber being connected to an exhaust system of the engine through a first parallel circuit including a first check valve opening in the direction of the exhaust system and a first throttle, said third diaphragm chamber being connected to the exhaust system of the engine through a second parallel circuit including a second check valve opening in the opposite direction of said first check valve and a second throttle, said fourth diaphragm chamber opening to atmosphere, and a rod coupled commonly to said first, second and third diaphragms, said rod being coupled to said means to operate said control valve.

10. An internal combustion engine as claimed in claim 9, wherein said pneumatic operational unit includes another valve operated by said rod, and wherein said means to operate includes a diaphragm coupled to said control valve and defining a diaphragm chamber which is connected to the suction system of the engine through the other valve operated by said rod.

* * * * *